(12) United States Patent
Sugimoto (10) Patent No.: US 7,934,371 B2
(45) Date of Patent: May 3, 2011

(54) INTERNAL COMBUSTION ENGINE SYSTEM AND CONTROL METHOD OF INTERNAL COMBUSTION ENGINE SYSTEM

(75) Inventor: Hitoki Sugimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 644 days.

(21) Appl. No.: 12/078,913

(22) Filed: Apr. 8, 2008

(65) Prior Publication Data

US 2008/0256929 A1   Oct. 23, 2008

(30) Foreign Application Priority Data

Apr. 19, 2007   (JP) .................................. 2007-110844

(51) Int. Cl.
*F01N 3/00* (2006.01)
(52) U.S. Cl. ................ 60/285; 60/274; 60/278; 60/286; 60/295; 123/676; 123/305; 123/431; 123/435
(58) Field of Classification Search ............ 60/273–274, 60/284–287, 295–301; 123/41.05, 217, 319–405, 123/406.45–406.48, 568.21–568.31, 578, 123/464, 453, 676, 678, 689, 698, 568.11–568.12, 123/295, 299, 300, 305, 431, 435, 478, 480, 123/491; 701/103–105, 108, 113
See application file for complete search history.

(56) References Cited

U.S. PATENT DOCUMENTS

| | | | | |
|---|---|---|---|---|
| 5,239,965 A | * | 8/1993 | Ninomiya | 123/492 |
| 5,771,688 A | * | 6/1998 | Hasegawa et al. | 60/276 |
| 7,438,048 B2 | * | 10/2008 | Onobayashi et al. | 123/352 |
| 2006/0117737 A1 | * | 6/2006 | Ohsaki | 60/276 |
| 2006/0200297 A1 | * | 9/2006 | Liu et al. | 701/104 |

FOREIGN PATENT DOCUMENTS

| | | |
|---|---|---|
| JP | 06-108926 A | 4/1994 |
| JP | 07-317606 A | 12/1995 |

* cited by examiner

*Primary Examiner* — Binh Q Tran
*Assistant Examiner* — Jesse Bogue
(74) *Attorney, Agent, or Firm* — Kenyon & Kenyon LLP (57) ABSTRACT

Under the condition that a catalyst temperature Tc of a purification catalyst reaches or exceeds a preset reference temperature Tcref, when a cooling water temperature Tw of an engine is not lower than a preset reference temperature Twref, the internal combustion engine system of the invention sets a target exhaust recirculation rate EGR* based on a given rotation speed Ne of the engine and a given load factor KL and performs exhaust recirculation control to open an EGR valve at a specific angle or opening corresponding to the set target exhaust recirculation rate EGR*. When the cooling water temperature Tw is lower than the preset reference temperature Twref, on the other hand, the internal combustion engine system of the invention sets a fuel increment amount α based on the given rotation speed Ne of the engine and the given load factor KL and performs fuel increment control to increase the specific amount of fuel, which is set relative to the amount of intake air to attain the stoichiometric air-fuel ratio as a value to be injected from a fuel injection valve, by the set fuel increment amount α. This arrangement effectively prevents overheat of the purification catalyst while minimizing the deterioration of fuel consumption.

13 Claims, 6 Drawing Sheets

INTERNAL COMBUSTION ENGINE SYSTEM AND CONTROL METHOD OF INTERNAL COMBUSTION ENGINE SYSTEM

BACKGROUND ART

1. Technical Field

The present invention relates to an internal combustion engine system including an internal combustion engine with a purification catalyst provided in an exhaust line thereof, a fuel injection module configured to inject a fuel into the internal combustion engine, an exhaust recirculation module arranged to recirculate part of exhaust of the internal combustion engine into a gas intake line of the internal combustion engine, and a temperature-reflecting physical quantity detector constructed to measure a temperature-reflecting physical quantity representing temperature of the internal combustion engine, and a control method of the internal combustion engine system.

2. Related Art

One proposed structure of an internal combustion engine system is equipped with an EGR (exhaust gas recirculation) device designed to recirculate the exhaust gas into a gas intake line (see, for example, Patent Document 1). The EGR device mounted on the internal combustion engine system sets an EGR rate according to the engine water temperature and controls on and off an EGR valve to recirculate the exhaust gas into the gas intake line at the set EGR rate. Such controlled recirculation of the exhaust gas aims to lower the temperature of the exhaust gas and thereby prevent an excessive increase of the engine temperature.

Patent Document 1: Japanese Patent Laid-Open No. H07-317606

SUMMARY OF THE INVENTION

The EGR device is not restrictively used to prevent the excessive increase of the engine temperature (engine water temperature), but is also applicable to lower the temperature of the exhaust gas and thereby prevent a temperature increase of a purification catalyst provided in an exhaust line of the engine. The low engine temperature condition generally worsens the combustion state in the engine and interferes with the EGR operation. The driver's heavy depression of an accelerator pedal to a significant depth immediately after a start of the engine in the cold state triggers an abrupt increase of the catalyst temperature and causes the state of low engine water temperature but high catalyst temperature. In this state, the EGR operation is not allowable, so that the catalyst temperature increases to an undesirably high level. One proposed measure for preventing the increase of the catalyst temperature consistently performs fuel amount increase control, in place of the EGR control, in the condition of the high catalyst temperature. The fuel amount increase control increases the amount of fuel to be injected from a fuel injection valve and utilizes the latent heat of vaporization in the increased amount of the fuel to cool down the purification catalyst. The increased amount of fuel injection, however, undesirably worsens the fuel consumption.

An object of the present invention is to provide an internal combustion engine system and the control method of the internal combustion engine system that prevent overheat of a purification catalyst while minimizing the deterioration of fuel consumption.

In order to achieve at least part of the above-mentioned and other related objects, the internal combustion engine system and the control method of the internal combustion engine system of the present invention is constructed as follows.

One aspect of the invention pertains to an internal combustion engine system including an internal combustion engine with a purification catalyst provided in an exhaust line thereof. In the internal combustion engine system of this aspect of the invention, a fuel injection module is configured to inject a fuel into the internal combustion engine. An exhaust recirculation module is arranged to recirculate part of exhaust of the internal combustion engine into a gas intake line of the internal combustion engine. A temperature-reflecting physical quantity detector is constructed to measure a temperature-reflecting physical quantity representing temperature of the internal combustion engine. A temperature increase controller is configured to, upon satisfaction of a preset condition for preventing a temperature increase of the purification catalyst, when the temperature of the internal combustion engine represented by the temperature-reflecting physical quantity measured by the temperature-reflecting physical quantity detector is not lower than a preset reference temperature, perform a first control of controlling the exhaust recirculation module to recirculate the part of the exhaust of the internal combustion engine into the gas intake line and thereby prevent the temperature increase of the purification catalyst, and when the temperature of the internal combustion engine represented by the temperature-reflecting physical quantity measured by the temperature-reflecting physical quantity detector is lower than the preset reference temperature, perform a second control of controlling the fuel injection module to increment an amount of the fuel to be injected into the internal combustion engine and thereby prevent the temperature increase of the purification catalyst.

Upon satisfaction of the preset condition for preventing the temperature increase of the purification catalyst, when the temperature of the internal combustion engine is not lower than the preset reference temperature, the internal combustion engine system of this aspect of the invention performs the first control of controlling the exhaust recirculation module to recirculate the part of the exhaust of the internal combustion engine into the gas intake line and thereby prevent the temperature increase of the purification catalyst. When the temperature of the internal combustion engine is lower than the preset reference temperature, on the other hand, the internal combustion engine system performs the second control of controlling the fuel injection module to increment the amount of the fuel to be injected into the internal combustion engine and thereby prevent the temperature increase of the purification catalyst. This arrangement effectively prevents overheat of the purification catalyst while minimizing the fuel consumption for controlling the temperature increase of the purification catalyst.

In the internal combustion engine system of the invention, the temperature increase controller may continue the second control without abruptly stopping even when the temperature of the internal combustion engine represented by the measured temperature-reflecting physical quantity increases from a level of lower than the preset reference temperature to a level of not lower than the preset reference temperature during execution of the second control. This arrangement effectively prevents the state of the engine from becoming unstable by an abrupt switchover between the first and the second control.

In the internal combustion engine system of the invention, the temperature increase controller may perform the second control irrespective of the temperature of the internal combustion engine represented by the measured temperature-reflecting physical quantity, in the event of any abnormality arising in the exhaust recirculation module. This arrangement ensures the temperature control of the catalyst even in the case of any abnormality arising in the fuel injection module.

In the internal combustion engine system of the invention, the temperature increase controller may assume satisfaction of the preset condition when the internal combustion engine is driven in a specific high load area, or when temperature of the purification catalyst is not lower than a preset reference catalyst temperature.

In the internal combustion engine system of the invention, the temperature-reflecting physical quantity detector may measure temperature of cooling water in the internal combustion engine.

The internal combustion engine system of the invention may be incorporated in a power output apparatus configured to output power to a driveshaft. The power output apparatus may have: an electric power-mechanical power input output assembly connected with the driveshaft and with an output shaft of the internal combustion engine in a rotatable manner independently of the driveshaft and configured to output a torque to the driveshaft and to the output shaft through input and output of electric power and mechanical power; and a motor designed to input and output power from and to the driveshaft. In this case, the electric power-mechanical power input output assembly may have: a generator designed to input and output power; and a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

Another aspect of the invention pertains to control method of an internal combustion engine system including: an internal combustion engine with a purification catalyst provided in an exhaust line thereof; a fuel injection module configured to inject a fuel into the internal combustion engine; an exhaust recirculation module arranged to recirculate part of exhaust of the internal combustion engine into a gas intake line of the internal combustion engine; and a temperature-reflecting physical quantity detector constructed to measure a temperature-reflecting physical quantity representing temperature of the internal combustion engine. The control method including the step of: upon satisfaction of a preset condition for preventing a temperature increase of the purification catalyst, when the temperature of the internal combustion engine represented by the temperature-reflecting physical quantity measured by the temperature-reflecting physical quantity detector is not lower than a preset reference temperature, performing a first control of controlling the exhaust recirculation module to recirculate the part of the exhaust of the internal combustion engine into the gas intake line and thereby prevent the temperature increase of the purification catalyst, and when the temperature of the internal combustion engine represented by the temperature-reflecting physical quantity measured by the temperature-reflecting physical quantity detector is lower than the preset reference temperature, performing a second control of controlling the fuel injection module to increment an amount of the fuel to be injected into the internal combustion engine and thereby prevent the temperature increase of the purification catalyst.

Upon satisfaction of the preset condition for preventing the temperature increase of the purification catalyst, when the temperature of the internal combustion engine is not lower than the preset reference temperature, the control method of this aspect of the invention performs the first control of controlling the exhaust recirculation module to recirculate the part of the exhaust of the internal combustion engine into the gas intake line and thereby prevent the temperature increase of the purification catalyst. When the temperature of the internal combustion engine is lower than the preset reference temperature, on the other hand, the control method performs the second control of controlling the fuel injection module to increment the amount of the fuel to be injected into the internal combustion engine and thereby prevent the temperature increase of the purification catalyst. This arrangement effectively prevents overheat of the purification catalyst while minimizing the fuel consumption for controlling the temperature increase of the purification catalyst.

In the control method of the invention, the step may continue the second control without abruptly stopping even when the temperature of the internal combustion engine represented by the measured temperature-reflecting physical quantity increases from a level of lower than the preset reference temperature to a level of not lower than the preset reference temperature during execution of the second control. This arrangement effectively prevents the state of the engine from becoming unstable by an abrupt switchover between the first and the second control.

In the control method of the invention, the step may perform the second control irrespective of the temperature of the internal combustion engine represented by the measured temperature-reflecting physical quantity, in the event of any abnormality arising in the exhaust recirculation module. This arrangement ensures the temperature control of the catalyst even in the case of any abnormality arising in the fuel injection module.

In the control method of the invention, the step may assume satisfaction of the preset condition when the internal combustion engine is driven in a specific high load area, or when temperature of the purification catalyst is not lower than a preset reference catalyst temperature.

DESCRIPTION OF THE PREFERRED EMBODIMENTS

Figure 1:
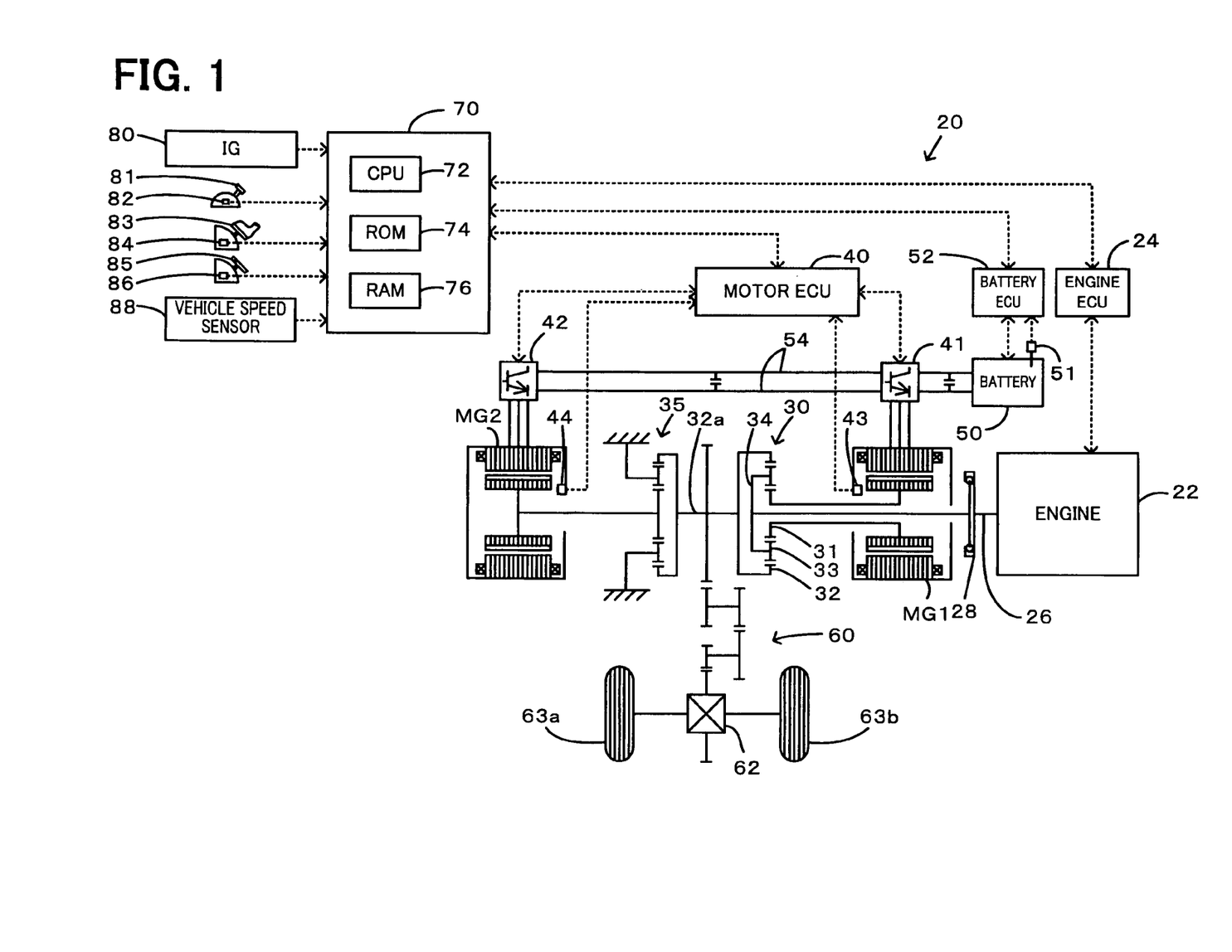
FIG. 1 schematically illustrates the configuration of a hybrid vehicle 20 equipped with an internal combustion engine system incorporated in a power output apparatus in one embodiment of the invention.
Figure 2:
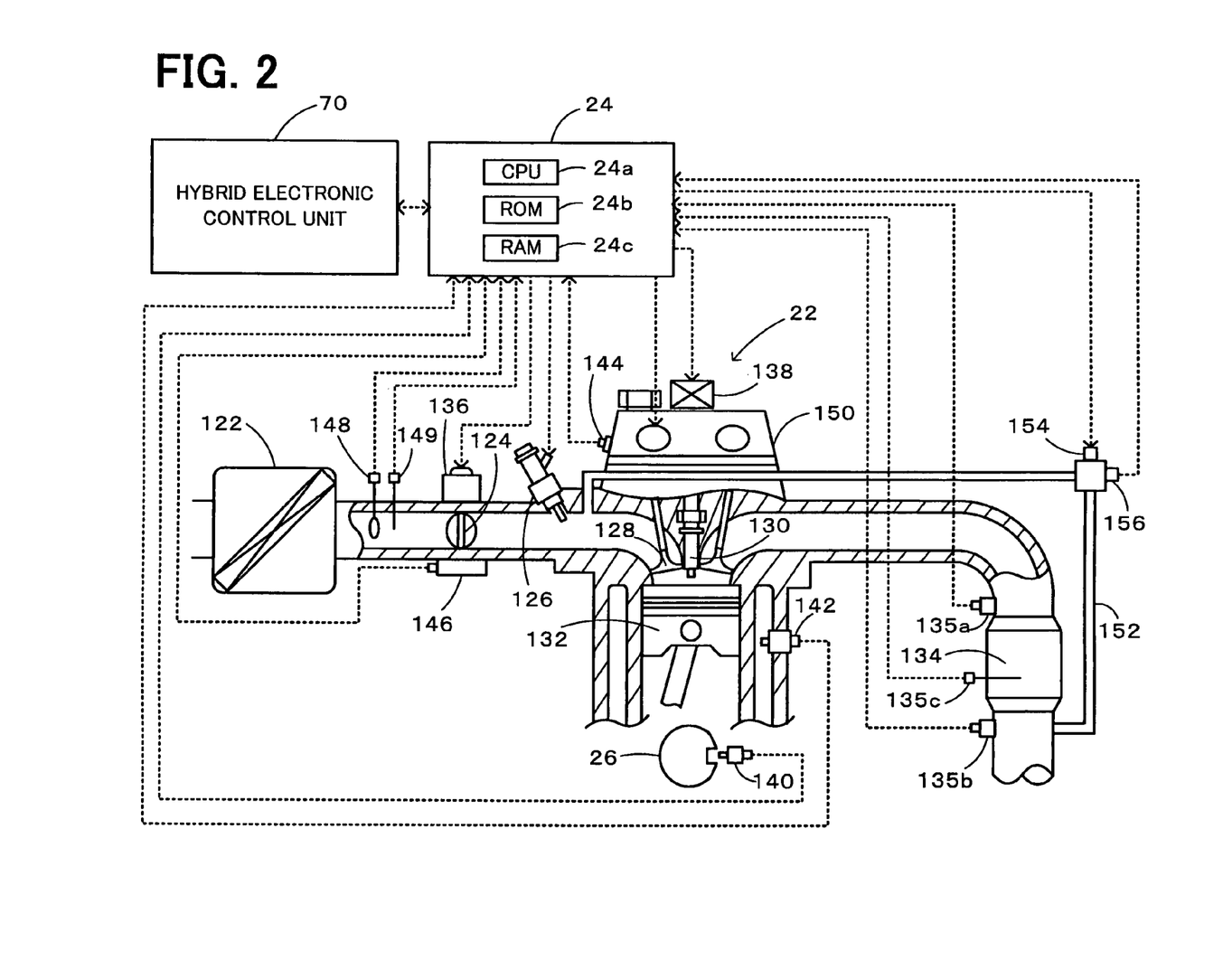
FIG. 2 is a schematic view showing the structure of an engine 22.

FIG. 1 schematically illustrates the configuration of a hybrid vehicle 20 equipped with an internal combustion engine system incorporated in a power output apparatus in one embodiment of the invention. FIG. 2 is a schematic view showing the structure of an engine 22. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20. The engine 22 and an engine electronic control unit 24 configured to control the operations of the engine 22 constitute the internal combustion engine system of this embodiment.

The engine 22 is constructed as a six-cylinder internal combustion engine designed to consume a hydrocarbon fuel, such as gasoline or light oil, and thereby generate power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 designed to convert toxic components included in the exhaust, that is, carbon monoxide (CO), hydrocarbons (HC), and nitrogen oxides (NOx), into harmless components and is discharged to the outside air. An EGR tube 152 is located after the catalytic converter 134 to recirculate the purified exhaust to the gas intake line. The engine 22 is thus designed to supply the purified exhaust as an uncombusted gas to the gas intake line and introduce the mixture of the air, the purified exhaust, and the fuel into the combustion chamber.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature Tw from a water temperature sensor 142 measured as the temperature of cooling water in the engine 22, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an air flow meter signal AF from an air flow meter 148 located in an air intake conduit, an intake air temperature from a temperature sensor 149 located in the air intake conduit, an air-fuel ratio from an air fuel ratio sensor 135a, an oxygen signal from an oxygen sensor 135b, and a catalyst temperature Tc from a catalyst temperature sensor 135c attached to the catalytic converter 134. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, control signals to a variable valve timing mechanism 150 to vary the open and close timings of the intake valve 128, and driving signals to an EGR valve 154 to regulate the flow of the purified exhaust recirculated to the gas intake line. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also performs various arithmetic operations to compute a rotation speed of the crankshaft 26 or a rotation speed Ne of the engine 22 from the crank position input from the crank position sensor 140 and to compute a load factor KL representing a ratio of the amount of intake air specified by the air flow meter signal AF input from the air flow meter 148 to a maximum possible amount of intake air.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

The motors MG1 and MG2 are constructed as known synchronous motor generators to enable operations as both a generator and a motor. The motors MG1 and MG2 transmit electric power to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor (not shown) attached to the battery 50. The battery ECU 52 outputs data relating to the state of the battery 50 to the hybrid electronic control unit 70 via communication according to the requirements.

The hybrid electronic control unit 70 is constructed as a microprocessor and includes a CPU 72, a ROM 74 that stores processing programs, a RAM 76 that temporarily stores data, an input-output port (not shown), and a communication port (not shown). The hybrid electronic control unit 70 receives various data and signals via the input port. The input data and signals include an ignition signal from an ignition switch 80, a gearshift position SP from a gearshift position sensor 82 that detects the current position of a gearshift lever 81, an accelerator opening Acc from an accelerator pedal position sensor 84 that detects the step-on amount of an accelerator pedal 83, a brake pedal position BP from a brake pedal position sensor 86 that detects the step-on amount of a brake pedal 85, and a vehicle speed V from a vehicle speed sensor 88. The hybrid electronic control unit 70 is connected with the engine ECU 24, the motor ECU 40, and the battery ECU 52 via the communication port as discussed above and transmits various control signals and data to and from the engine ECU 24, the motor ECU 40, and the battery ECU 52.

The hybrid vehicle 20 of the embodiment constructed as described above sets a torque demand Tr*, which is to be output to the ring gear shaft 32a or the driveshaft, based on the vehicle speed V and the accelerator opening Acc determined by the driver's depression amount of the accelerator pedal 83, and controls the operations of the engine 22 and the motors MG1 and MG2 to ensure output of a power demand equivalent to the preset torque demand Tr* to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

The control procedure of the engine 22 sets a target exhaust recirculation rate EGR* as an object ratio of the amount of the purified exhaust as the uncombusted gas recirculated to the gas intake line to the amount of intake air, based on the torque demand Tr* and the vehicle speed V. The EGR valve 154 is driven and controlled to open at a specific angle or opening corresponding to the set target exhaust recirculation rate EGR*. The variable valve timing mechanism 150 is controlled to have the open and close timings of the intake valve 128 according to the accelerator opening Acc and the torque demand Tr*, while the throttle valve 124 is controlled to have a throttle opening according to a target torque Te* to be output from the engine 22 and the target exhaust recirculation rate EGR*. The fuel injection valve 126 is controlled to inject a specific amount of fuel at an adequate timing. The specific amount of fuel is set relative to the amount of intake air to attain the stoichiometric air-fuel ratio as a value to be injected from the fuel injection valve 126. When the cooling water temperature Tw of the engine 22 does not reach a preset reference temperature Twref, recirculation of the purified exhaust to the gas intake line undesirably worsens the combustion state. In this state, the target exhaust recirculation rate EGR* is accordingly set equal to 0, which represents no recirculation of the purified exhaust to the gas intake line.

Figure 3:
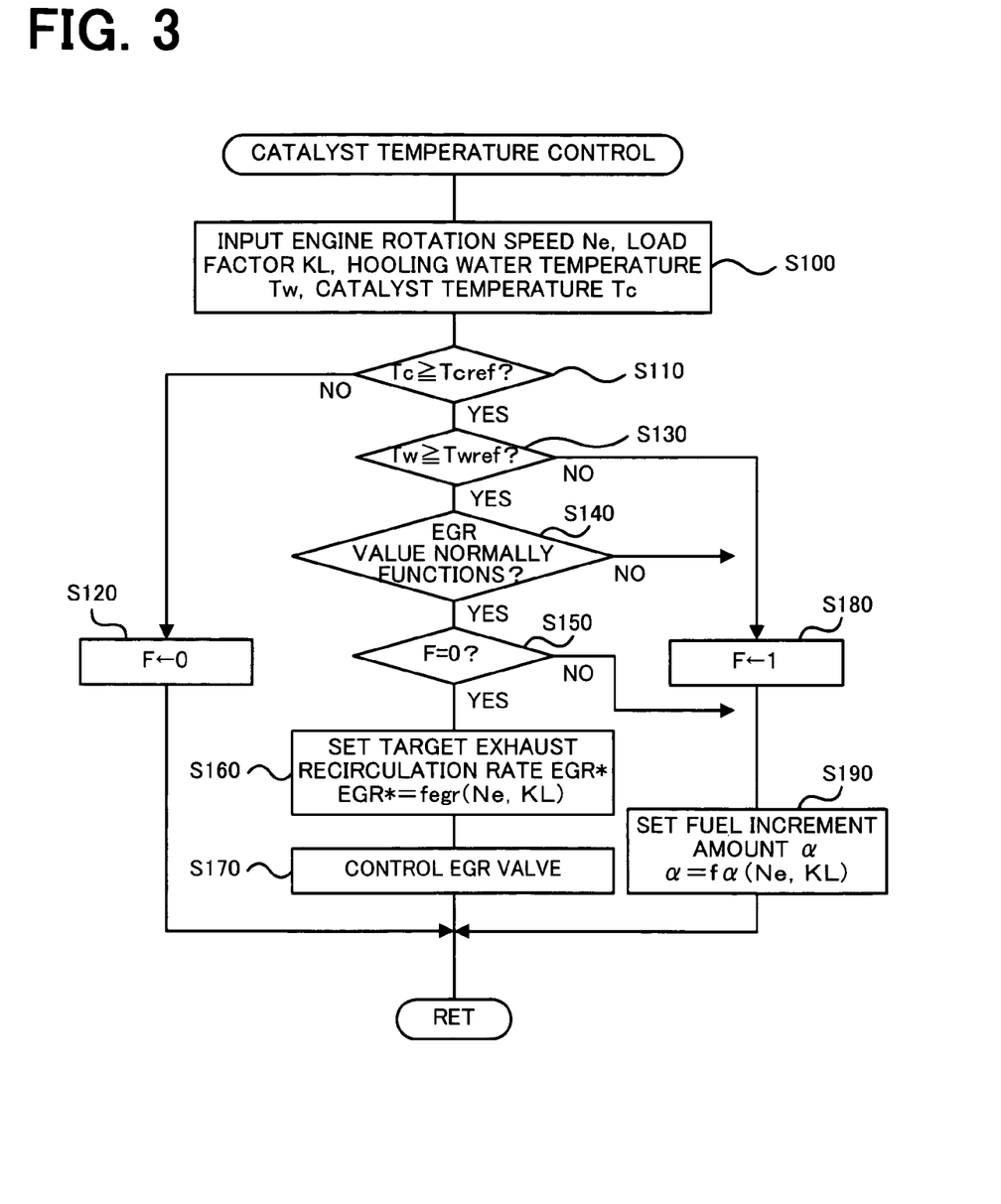
FIG. 3 is a flowchart showing a catalyst temperature control routine executed by the engine ECU 24.

The description regards the operations of the internal combustion engine system incorporated in the power output apparatus mounted on the hybrid vehicle 20 having the configuration discussed above, especially a series of operation control to regulate the catalyst temperature Tc of the catalytic converter 134. FIG. 3 is a flowchart showing a catalyst temperature control routine executed by the engine ECU 24. This catalyst temperature control routine is repeatedly performed at preset time intervals, for example, at every several ten msec.

On the start of the catalyst temperature control routine, the CPU 24a of the engine ECU 24 first inputs various data required for control, the rotation speed Ne of the engine 22, the load factor KL, the cooling water temperature Tw from the water temperature sensor 142, and the catalyst temperature Tc from the catalyst temperature sensor 135c (step S100). The input rotation speed Ne of the engine 22 is computed from the crank position of the crankshaft 26 detected by the crank position sensor 140. The input load factor KL of the engine 22 is computed from the air flow meter signal AF of the air flow meter 148.

After the data input, it is determined whether the input catalyst temperature Tc reaches or exceeds a preset reference temperature Tcref (step S110). The reference temperature Tcref is set to be slightly lower than an upper limit of an adequate temperature range of the catalyst in the catalytic converter 134, for example, 850° C., 900° C., or 950°. When the catalyst temperature Tc is lower than the preset reference temperature Tcref (step S110: no), the catalyst in the catalytic converter 134 is expected to have the temperature in the adequate temperature range. The CPU 24a then resets a fuel increment flag F to 0 (step S120) and exits from the catalyst temperature control routine of FIG. 3.

Figure 4:
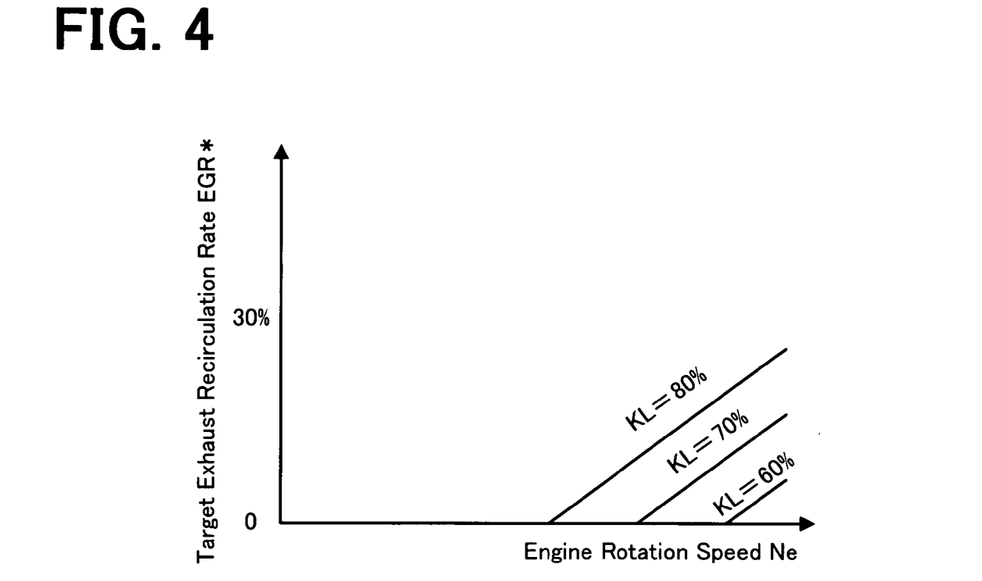
FIG. 4 shows one example of an exhaust recirculation rate setting map.

When the catalyst temperature Tc is not lower than the preset reference temperature Tcref (step S110: yes), on the other hand, it is required to prevent a further increase in temperature of the catalyst in the catalytic converter 134. The CPU 24a then sequentially determines whether the input cooling water temperature Tw of the engine 22 is equal to or higher than the preset reference temperature Twref (step S130), whether the EGR valve 154 normally functions (step S140), and whether the fuel increment flag F is equal to 0 (step S150). When it is determined that the cooling water temperature Tw of the engine 22 is not lower than the preset reference temperature Twref, the EGR valve 154 normally functions, and the fuel increment flag F is equal to 0 (all steps S130, S140, S150: yes), the target exhaust recirculation rate EGR* is set based on the input rotation speed Ne of the engine 22 and the input load factor KL (step S160). The CPU 24a then controls the EGR valve 154 to open at a specific angle or opening corresponding to the set target exhaust recirculation rate EGR* (step S170) and exits from the catalyst temperature control routine. A concrete procedure of setting the target exhaust recirculation rate EGR* in this embodiment provides and stores in advance variations in target exhaust recirculation rate EGR* against the rotation speed Ne of the engine 22 with regard to multiple settings of the load factor KL as an exhaust recirculation rate setting map in the ROM 24b and reads the target exhaust recirculation rate EGR* according to the given rotation speed Ne and the given load factor KL from the exhaust recirculation rate setting map. One example of the exhaust recirculation rate setting map is shown in FIG. 4. As shown in FIG. 4, the exhaust recirculation rate setting map is designed to increase the target exhaust recirculation rate EGR* with an increase in rotation speed Ne and with an increase in load factor KL. This is because the exhaust of the engine 22 tends to have high temperature and increase the temperature of the catalyst in the catalytic converter 134 during operation of the engine 22 in a high load drive area of the high rotation speed Ne and the high load factor KL. The exhaust recirculation control of recirculating part of the exhaust (uncombusted gas) of the engine 22 to the gas intake line effectively increases the heat capacity and lowers the temperature of the exhaust of the engine 22, thus controlling the temperature increase of the catalyst in the catalytic converter 134.

Figure 5:
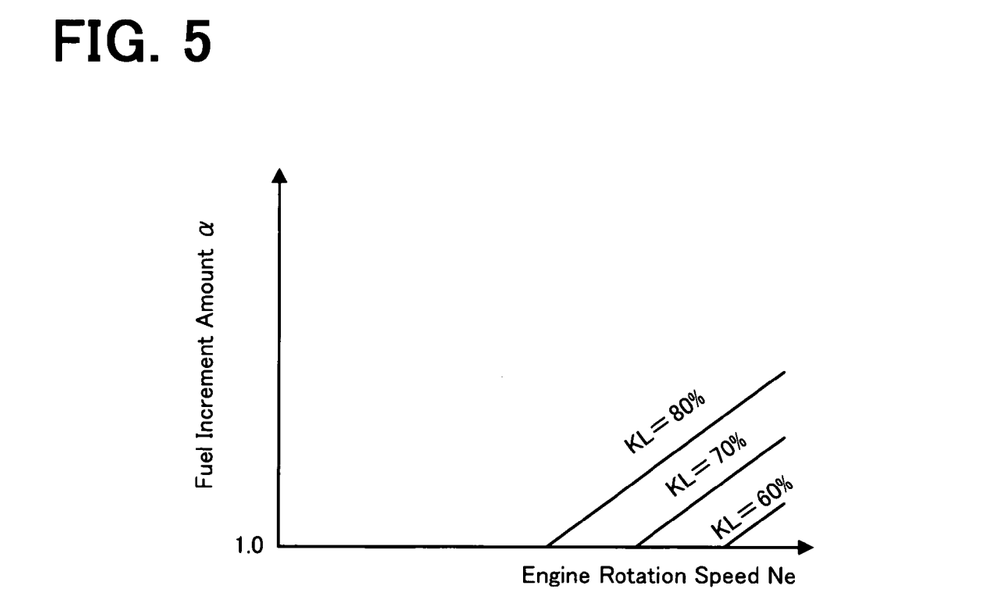
FIG. 5 shows one example of a fuel increment amount setting map.

When the cooling water temperature Tw of the engine 22 is lower than the preset reference temperature Twref (step S130: no), the CPU 24a sets the fuel increment flag F to 1 (step S180) and sets a fuel increment amount a based on the input rotation speed Ne of the engine 22 and the input load factor KL (step S190). The catalyst temperature control routine is then terminated. The fuel increment amount a represents an amount of fuel to be increased from the specific amount of fuel, which is set relative to the amount of intake air to attain the stoichiometric air-fuel ratio as a value to be injected from the fuel injection valve 126. A concrete procedure of setting the fuel increment amount a in this embodiment provides and stores in advance variations in fuel increment amount a against the rotation speed Ne of the engine 22 with regard to multiple settings of the load factor KL as a fuel increment amount setting map in the ROM 24b and reads the fuel increment amount a according to the given rotation speed Ne and the given load factor KL from the fuel increment amount setting map. One example of the fuel increment amount setting map is shown in FIG. 5. As shown in FIG. 5, the fuel increment amount setting map is designed to increase the fuel increment amount a with an increase in rotation speed Ne and with an increase in load factor KL. This is because the exhaust tends to have high temperature and increase the temperature of the catalyst in the catalytic converter 134 during operation of the engine 22 in the high load drive area of the high rotation speed Ne and the high load factor KL. The fuel increment control of increasing the specific amount of fuel, which is set relative to the amount of intake air to attain the stoichiometric air-fuel ratio as a value to be injected from the fuel injection valve 126, by the fuel increment amount a effectively utilizes the latent heat of vaporization in the increased amount of fuel to exert the cooling effect, thus controlling the temperature increase of the catalyst in the catalytic converter 134.

It is here assumed that the driver presses down the accelerator pedal 83 to a significantly large depth immediately after a start of the engine 22 in the cold state. In this case, the engine 22 is driven in a high load area of the relatively high rotation speed and the high torque. The exhaust accordingly tends to have high temperature and abruptly increases the temperature of the catalyst in the catalytic converter 134. In some conditions, the catalyst temperature Tc of the catalytic converter 134 reaches or exceeds the preset reference temperature Tcref, before the cooling water temperature Tw becomes equal to or higher than the preset reference temperature Twref. At the cooling water temperature Tw of lower than the preset reference temperature Twref, the combustion state in the engine 22 is rather unstable, so that the exhaust recirculation control of recirculating part of the exhaust to the gas intake line is not allowable. When the cooling water temperature Tw is lower than the preset reference temperature Twref (step S130: no), the catalyst temperature control routine performs the fuel increment control (step S190) to increase the specific amount of fuel, which is set relative to the amount of intake air to attain the stoichiometric air-fuel ratio as a value to be injected from the fuel injection valve 126, by the fuel increment amount α. Even in the state of not allowing the exhaust recirculation control, the fuel increment control is performed to effectively control the temperature increase of the catalyst in the catalytic converter 134. The fuel increment control causes the fuel injection valve 126 to inject the increased amount of fuel corresponding to the fuel increment amount α. Injection of the increased amount of fuel naturally worsens the fuel consumption. The fuel increment control is, however, performed only when the cooling water temperature Tw is lower than the preset reference temperature Twref. This arrangement desirably minimizes the potential deterioration of fuel consumption.

In the event of detection of any abnormality in the EGR valve 154 (step S140: no), the exhaust recirculation control is not allowable even at the cooling water temperature Tw of not lower than the preset reference temperature Twref (step S130: yes). The CPU 24a then sets the fuel increment flag F to 1 (step S180) and specifies the fuel increment amount a (step S190) to perform the fuel increment control. Namely in the event of some abnormality arising in the EGR valve 154, the fuel increment control is performed, irrespective of the level of the cooling water temperature Tw. The fuel increment flag F1 set to 1 implies execution of the fuel increment control. In response to detection of the fuel increment flag F1 set to 1 (step S150: no), the catalyst temperature control routine does not perform the exhaust recirculation control (steps S160 and S170) but continues the fuel increment control (step S190) even at the cooling water temperature Tw of not lower than the preset reference temperature Twref (step S130: yes) with no abnormality arising in the EGR valve 154 (step S140: yes). This arrangement effectively prevents the state of the engine 22 from becoming unstable by an abrupt switchover of the control from the fuel increment control to the exhaust recirculation control.

As described above, under the condition that the catalyst temperature Tc reaches or exceeds the preset reference temperature Tcref, when the cooling water temperature Tw is not lower than the preset reference temperature Twref, the internal combustion engine system of the embodiment sets the target exhaust recirculation rate EGR* based on the rotation speed Ne of the engine 22 and the load factor KL and performs the exhaust recirculation control to open the EGR valve 154 at a specific angle or opening corresponding to the set target exhaust recirculation rate EGR*. When the cooling water temperature Tw is lower than the preset reference temperature Twref, on the other hand, the internal combustion engine system of the embodiment sets the fuel increment amount a based on the rotation speed Ne of the engine 22 and the load factor KL and performs the fuel increment control to increase the specific amount of fuel, which is set relative to the amount of intake air to attain the stoichiometric air-fuel ratio as a value to be injected from the fuel injection valve 126, by the set fuel increment amount α. This arrangement effectively controls the temperature increase of the catalyst in the catalytic converter 134 even in the state of not allowing the exhaust recirculation control where the cooling water temperature Tw is lower than the preset reference temperature Twref. This arrangement desirably minimizes the deterioration of fuel consumption, compared with the conventional fuel increment control performed consistently to control the temperature increase of the catalyst. The fuel increment control does not abruptly stop but continues even when the cooling water temperature Tw becomes equal to or higher than the preset reference temperature Twref during execution of the fuel increment control. This arrangement effectively prevents the state of the engine 22 from becoming unstable by an abrupt switchover of the control from the fuel increment control to the exhaust recirculation control. In the event of some abnormality arising in the EGR valve 154, the fuel increment control is performed, irrespective of the level of the cooling water temperature Tw. The catalyst temperature control of this embodiment thus ensures the temperature control of the catalyst even in the case of any abnormality arising in the EGR valve 154.

The internal combustion engine system of the embodiment does not abruptly stop but continues the fuel increment control even when the cooling water temperature Tw becomes equal to or higher than the preset reference temperature Twref during execution of the fuel increment control. One modification may switch over the control from the fuel increment control to the exhaust recirculation control upon satisfaction of a predetermined condition.

The internal combustion engine system of the embodiment determines whether the EGR valve 154 normally functions and, in the event of detection of any abnormality in the EGR valve 154, performs the fuel increment control. One modification of the catalyst temperature control routine may omit such detection for any abnormality of the EGR valve 154 from the catalyst temperature control routine when not required.

The internal combustion engine system of the embodiment specifies the requirement for preventing the temperature increase of the catalyst in the catalytic converter 134 according to the catalyst temperature Tc measured by the catalyst temperature sensor 135c. One modification may determine whether the engine 22 is driven in the high load area of the high rotation speed and the high torque based on the rotation speed Ne of the engine 22 and the load factor KL and may specify the requirement for preventing the temperature increase of the catalyst in the catalytic converter 134 according to the result of such determination. Another modification may specify the requirement for preventing the temperature increase of the catalyst in the catalytic converter 134 according to another parameter.

Figure 6:
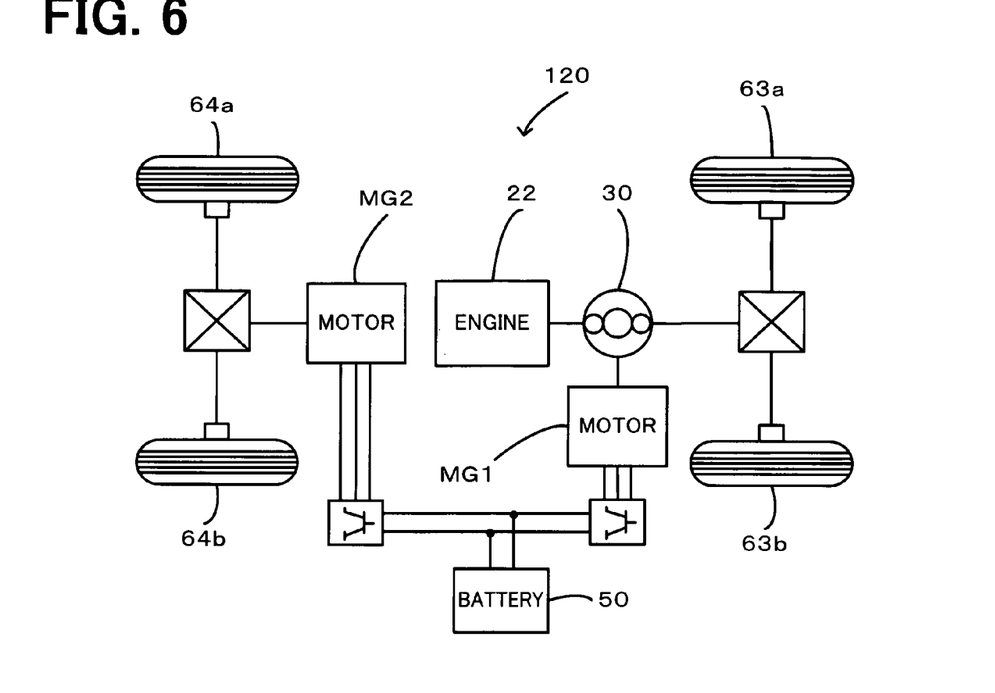
FIG. 6 schematically illustrates the configuration of a hybrid vehicle 120 of one modified structure.
Figure 7:
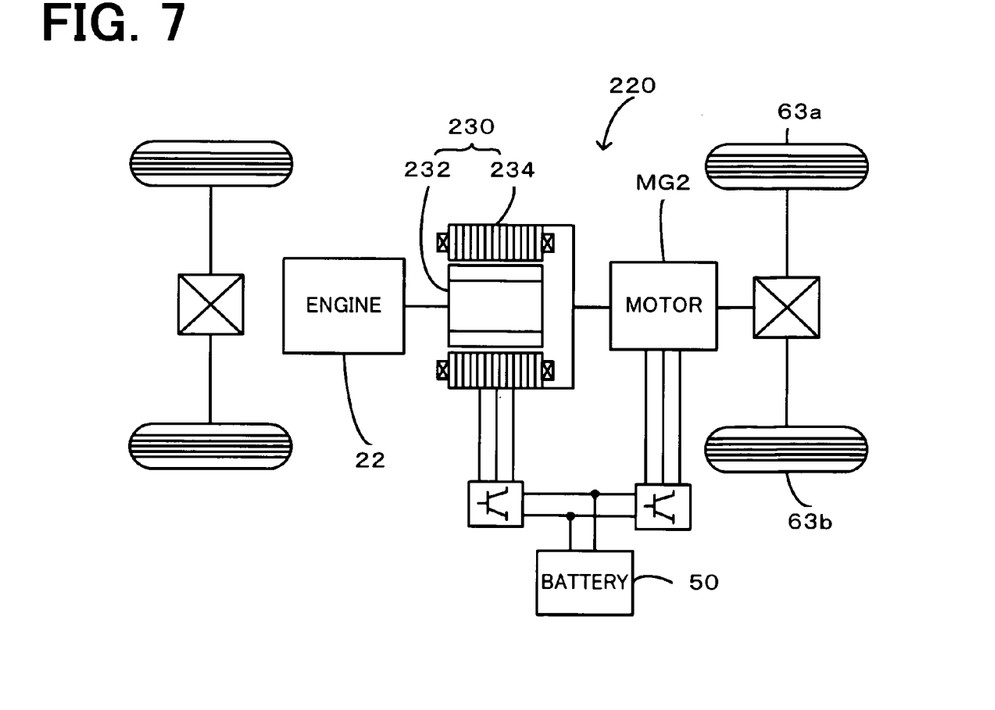
FIG. 7 schematically illustrates the configuration of a hybrid vehicle 220 of another modified structure.
Figure 8:
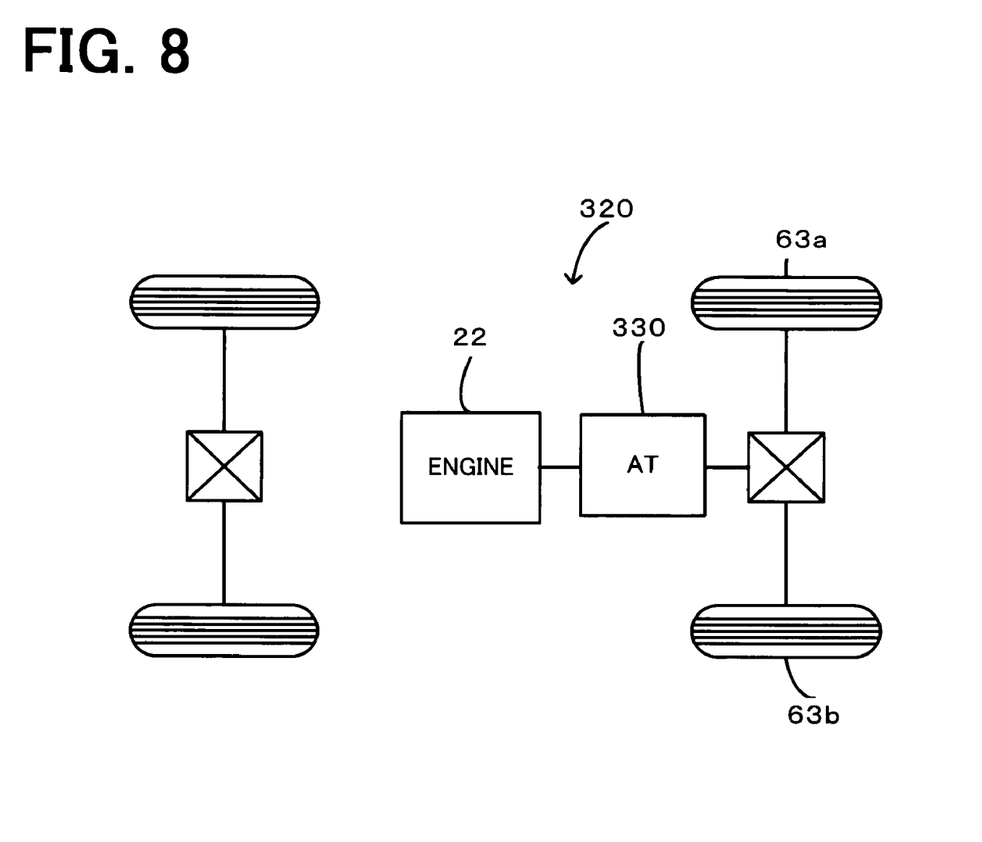
FIG. 8 schematically illustrates the configuration of a vehicle 320 of another modified structure.

In the hybrid vehicle 20 of the embodiment, the power of the motor MG2 is subjected to speed change by the reduction gear 35 and is output to the ring gear shaft 32a. The technique of the invention is, however, not restricted to this configuration but is also applicable to a hybrid vehicle 120 of one modified structure shown in FIG. 6. In the hybrid vehicle 120 of FIG. 6, the power of the motor MG2 is output to another axle (axle linked with wheels 64a and 64b) that is different from the axle connecting with the ring gear shaft 32a (axle linked with the drive wheels 63a and 63b). In the hybrid vehicle 20 of the embodiment, the power of the engine 22 is transmitted via the power distribution integration mechanism 30 to the ring gear shaft 32a as the driveshaft linked with the drive wheels 63a and 63b. The technique of the invention is, however, not restricted to this configuration but is also applicable to a hybrid vehicle 220 of another modified structure shown in FIG. 7. The hybrid vehicle 220 of FIG. 7 is equipped with a pair-rotor motor 230. The pair-rotor motor 230 includes an inner rotor 232 connected to the crankshaft 26 of the engine 22 and an outer rotor 234 connected to the drive shaft arranged to output power to the drive wheels 63a and 63b. The pair-rotor motor 230 transmits part of the output power of the engine 22 to the driveshaft, while converting the residual engine output power into electric power. The technique of the invention is also applicable to an automobile 320 of a conventional structure driven with the power of the engine 22 that is subjected to speed change by an automatic transmission 330 and is output to the drive wheels 63a and 63b as shown in FIG. 8.

The embodiment regards the internal combustion engine system incorporated in the power output apparatus mounted on the hybrid vehicle 20. The principle of the invention is also attainable as an internal combustion engine system incorporated in a power output apparatus mounted on any of various vehicles other than the hybrid vehicles as well as any of various other moving bodies including ships and boats and aircraft. The principle of the invention is further attainable as an internal combustion engine system incorporated in a power output apparatus built in diversity of stationary equipment, such as construction machinery. The internal combustion engine system may be not part of such a power output apparatus but may be constructed separately from the power output apparatus. Another application of the invention is a control method of the internal combustion engine system.

The primary elements in the embodiment and its modified examples are mapped to the primary constituents in the claims of the invention as described below. The engine 22 of the embodiment is equivalent to the 'internal combustion engine' of the invention. The combination of the fuel injection valve 126 with the engine ECU 24 configured to control the fuel injection valve 126 corresponds to the 'fuel injection module' of the invention. The combination of the EGR pipe 152 and the EGR valve 154 with the engine ECU 24 configured to control the EGR valve 154 corresponds to the 'exhaust recirculation module' of the invention. The water temperature sensor 142 is equivalent to the 'temperature-reflecting physical quantity detector' of the invention. The engine ECU 24 configured to perform the catalyst temperature control routine of FIG. 3 is equivalent to the 'temperature increase controller' of the invention. Under the condition that the catalyst temperature Tc reaches or exceeds the preset reference temperature Tcref, when the cooling water temperature Tw is not lower than the preset reference temperature Twref, the catalyst temperature control routine of FIG. 3 sets the target exhaust recirculation rate EGR* based on the rotation speed Ne of the engine 22 and the load factor KL and performs the exhaust recirculation control to open the EGR valve 154 at a specific angle or opening corresponding to the set target exhaust recirculation rate EGR*. When the cooling water temperature Tw is lower than the preset reference temperature Twref, on the other hand, the catalyst temperature control routine of FIG. 3 sets the fuel increment amount a based on the rotation speed Ne of the engine 22 and the load factor KL and performs the fuel increment control to increase the specific amount of fuel, which is set relative to the amount of intake air to attain the stoichiometric air-fuel ratio as a value to be injected from the fuel injection valve 126, by the fuel increment amount α. The combination of the power distribution integration mechanism 30 with the motor MG1 in the embodiment or the pair-rotor motor 230 in the modified example corresponds to the 'electric power-mechanical power input output assembly' of the invention. The motor MG2, the motor MG1, and the power distribution integration mechanism 30 are respectively equivalent to the 'motor', the 'generator', and the 'three shaft-type power input output structure' of the invention. The 'internal combustion engine' is not restricted to the engine 22 designed to consume a hydrocarbon fuel, such as gasoline or light oil, and thereby output power, but may be an internal combustion engine of any other design, for example, a hydrogen engine. The 'fuel injection module' is not restricted to the combination of the fuel injection valve 126 with the engine ECU 24 configured to control the fuel injection valve 126 but may be any configuration of enabling injection of the fuel into the internal combustion engine. The 'exhaust recirculation module' is not restricted to the combination of the EGR pipe 152 and the EGR valve 154 with the engine ECU 24 configured to control the EGR valve 154 but may be any configuration of regulating the exhaust recirculation rate as the ratio of the amount of exhaust recirculated to the gas intake line of the internal combustion engine to the amount of intake air and recirculating the exhaust to the gas intake line at the regulated exhaust recirculation rate. The 'temperature increase controller' is not restricted to the engine ECU 24 configured to perform the catalyst temperature control routine of FIG. 3 that, under the condition of the catalyst temperature Tc of not lower than the preset reference temperature Tcref, at the cooling water temperature Tw of not lower than the preset reference temperature Twref, sets the target exhaust recirculation rate EGR* based on the rotation speed Ne of the engine 22 and the load factor KL and performs the exhaust recirculation control to open the EGR valve 154 at a specific angle or opening corresponding to the set target exhaust recirculation rate EGR*, while at the cooling water temperature Tw of lower than the preset reference temperature Twref, setting the fuel increment amount a based on the rotation speed Ne of the engine 22 and the load factor KL and performing the fuel increment control to increase the specific amount of fuel, which is set relative to the amount of intake air to attain the stoichiometric air-fuel ratio as a value to be injected from the fuel injection valve 126, by the fuel increment amount α. The 'temperature increase controller' may be any configuration that, upon satisfaction of a preset condition for preventing a temperature increase of the purification catalyst, when the temperature of the internal combustion engine represented by the temperature-reflecting physical quantity measured by the temperature-reflecting physical quantity detector is not lower than the preset reference temperature, performs the first control of controlling the exhaust recirculation module to recirculate part of the exhaust of the internal combustion engine into the gas intake line and thereby prevent the temperature increase of the purification catalyst, and when the temperature of the internal combustion engine represented by the temperature-reflecting physical quantity measured by the temperature-reflecting physical quantity detector is lower than the preset reference temperature, performs the second control of controlling the fuel injection module to increment the amount of the fuel to be injected into the internal combustion engine and thereby prevent the temperature increase of the purification catalyst. The 'electric power-mechanical power input output assembly' is not restricted to the combination of the power distribution integration mechanism 30 with the motor MG2 or to the pair-rotor motor 230 but may be any structure connected with the driveshaft and with the output shaft of the internal combustion engine in a rotatable manner independently of the driveshaft and configured to output the torque to the driveshaft and to the output shaft through input and output of electric power and mechanical power. The 'motor' is not restricted to the motor MG2 constructed as a synchronous motor generator but may be any type of motor designed to input and output power from and to the driveshaft, for example, an induction motor. The 'generator' is not restricted to the motor MG1 constructed as a synchronous motor generator but may be any type of generator designed to input and output power, for example, an induction motor generator. The 'three shaft-type power input output structure' is not restricted to the power distribution integration mechanism 30 but may be any structure connected to three shafts, the driveshaft, the output shaft of the internal combustion engine, and the rotating shaft of the generator, and designed to input and output power to a residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

The embodiment discussed above is to be considered in all aspects as illustrative and not restrictive. There may be many modifications, changes, and alterations without departing from the scope or spirit of the main characteristics of the present invention.

The present invention claims priority from Japanese Patent Application No. 2007-110844 filed on Apr. 19, 2007, the entire contents of which are incorporated herein by reference.

What is claimed is:

1. An internal combustion engine system including an internal combustion engine with a purification catalyst provided in an exhaust line thereof, the internal combustion engine system comprising:
    a fuel injection module configured to inject a fuel into the internal combustion engine;
    an exhaust recirculation module arranged to recirculate part of exhaust of the internal combustion engine into a gas intake line of the internal combustion engine;
    a temperature-reflecting physical quantity detector constructed to measure a temperature-reflecting physical quantity representing temperature of the internal combustion engine; and
    a temperature increase controller configured to, upon satisfaction of a preset condition for preventing a temperature increase of the purification catalyst, when the temperature of the internal combustion engine represented by the temperature-reflecting physical quantity measured by the temperature-reflecting physical quantity detector is not lower than a preset reference temperature, perform a first control of controlling the exhaust recirculation module to recirculate the part of the exhaust of the internal combustion engine into the gas intake line and thereby prevent the temperature increase of the purification catalyst, and when the temperature of the internal combustion engine represented by the temperature-reflecting physical quantity measured by the temperature-reflecting physical quantity detector is lower than the preset reference temperature, perform a second control of controlling the fuel injection module to increment an amount of the fuel to be injected into the internal combustion engine and thereby prevent the temperature increase of the purification catalyst.

2. The internal combustion engine system in accordance with claim 1, wherein the temperature increase controller does not abruptly stop but continues the second control even when the temperature of the internal combustion engine represented by the measured temperature-reflecting physical quantity increases from a level of lower than the preset reference temperature to a level of not lower than the preset reference temperature during execution of the second control.

3. The internal combustion engine system in accordance with claim 1, wherein the temperature increase controller performs the second control irrespective of the temperature of the internal combustion engine represented by the measured temperature-reflecting physical quantity, in the event of any abnormality arising in the exhaust recirculation module.

4. The internal combustion engine system in accordance with claim 1, wherein the temperature increase controller assumes satisfaction of the preset condition when the internal combustion engine is driven in a specific high load area.

5. The internal combustion engine system in accordance with claim 1, wherein the temperature increase controller assumes satisfaction of the preset condition when temperature of the purification catalyst is not lower than a preset reference catalyst temperature.

6. The internal combustion engine system in accordance with claim 1, wherein the temperature-reflecting physical quantity detector measures temperature of cooling water in the internal combustion engine.

7. The internal combustion engine system in accordance with claim 1, the internal combustion engine system being incorporated in a power output apparatus configured to output power to a driveshaft, wherein the power output apparatus has:

an electric power-mechanical power input output assembly connected with the driveshaft and with an output shaft of the internal combustion engine in a rotatable manner independently of the driveshaft and configured to output a torque to the driveshaft and to the output shaft through input and output of electric power and mechanical power; and a motor designed to input and output power from and to the driveshaft.

8. The internal combustion engine system in accordance with claim 7, wherein the electric power-mechanical power input output assembly has:

a generator designed to input and output power; and a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

9. A control method of an internal combustion engine system including: an internal combustion engine with a purification catalyst provided in an exhaust line thereof; a fuel injection module configured to inject a fuel into the internal combustion engine; an exhaust recirculation module arranged to recirculate part of exhaust of the internal combustion engine into a gas intake line of the internal combustion engine; and a temperature-reflecting physical quantity detector constructed to measure a temperature-reflecting physical quantity representing temperature of the internal combustion engine, the control method comprising the step of:

upon satisfaction of a preset condition for preventing a temperature increase of the purification catalyst, when the temperature of the internal combustion engine represented by the temperature-reflecting physical quantity measured by the temperature-reflecting physical quantity detector is not lower than a preset reference temperature, performing a first control of controlling the exhaust recirculation module to recirculate the part of the exhaust of the internal combustion engine into the gas intake line and thereby prevent the temperature increase of the purification catalyst, and when the temperature of the internal combustion engine represented by the temperature-reflecting physical quantity measured by the temperature-reflecting physical quantity detector is lower than the preset reference temperature, performing a second control of controlling the fuel injection module to increment an amount of the fuel to be injected into the internal combustion engine and thereby prevent the temperature increase of the purification catalyst.

10. The control method in accordance with claim 9, wherein said step does not abruptly stop but continues the second control even when the temperature of the internal combustion engine represented by the measured temperature-reflecting physical quantity increases from a level of lower than the preset reference temperature to a level of not lower than the preset reference temperature during execution of the second control.

11. The control method in accordance with claim 9, wherein said step performs the second control irrespective of the temperature of the internal combustion engine represented by the measured temperature-reflecting physical quantity, in the event of any abnormality arising in the exhaust recirculation module.

12. The control method in accordance with claim 9, wherein said step assumes satisfaction of the preset condition when the internal combustion engine is driven in a specific high load area.

13. The control method in accordance with claim 9, wherein said step assumes satisfaction of the preset condition when temperature of the purification catalyst is not lower than a preset reference catalyst temperature.

* * * * *

UNITED STATES PATENT AND TRADEMARK OFFICE
CERTIFICATE OF CORRECTION

PATENT NO. : 7,934,371 B2
APPLICATION NO. : 12/078913
DATED : May 3, 2011
INVENTOR(S) : Hitoki Sugimoto Page 1 of 1

It is certified that error appears in the above-identified patent and that said Letters Patent is hereby corrected as shown below:

| Column | Line | |
|---|---|---|
| 9 | 41 | Change "amount a" to --amount α--. |
| 9 | 44 | Change "amount a" to --amount α--. |
| 9 | 49 | Change "amount a" to --amount α--. |
| 9 | 50 | Change "amount a" to --amount α--. |
| 9 | 54 | Change "amount a" to --amount α--. |
| 9 | 59 | Change "amount a" to --amount α--. |
| 10 | 1 | Change "amount a" to --amount α--. |
| 10 | 44 | Change "amount a" to --amount α--. |
| 11 | 7 | Change "amount a" to --amount α--. |
| 13 | 1 | Change "amount a" to --amount α--. |
| 13 | 45 | Change "amount a" to --amount α--. |

Signed and Sealed this
Twenty-second Day of November, 2011

David J. Kappos
*Director of the United States Patent and Trademark Office*